(12) United States Patent
Suess (10) Patent No.: US 8,857,492 B2
(45) Date of Patent: Oct. 14, 2014

(54) RETRACTABLE SAFETY COVER FOR A RAIL SYSTEM IN A MOTOR VEHICLE

(75) Inventor: Uwe Suess, Frankfurt (DE)

(73) Assignee: GM Global Technology Operations LLC, Detroit, MI (US)

(*) Notice: Subject to any disclaimer, the term of this patent is extended or adjusted under 35 U.S.C. 154(b) by 896 days.

(21) Appl. No.: 12/944,638

(22) Filed: Nov. 11, 2010

(65) Prior Publication Data

US 2011/0108211 A1 May 12, 2011

(30) Foreign Application Priority Data

Nov. 11, 2009 (DE) .................... 20 2009 017 836 U
Apr. 20, 2010 (DE) ........................ 10 2010 015 537

(51) Int. Cl.
*E04F 10/10* (2006.01)
*B60R 7/04* (2006.01)
*B60J 7/00* (2006.01)
*E06B 9/11* (2006.01)

(52) U.S. Cl.
CPC ................ *B60J 7/0015* (2013.01); *B60R 7/04* (2013.01); *B60J 7/003* (2013.01); *E06B 9/115* (2013.01)
USPC ......................................... 160/36; 160/231.1

(58) Field of Classification Search
USPC ............... 160/32, 33, 34, 35, 36, 230, 231.1, 160/231.2, 202, 84.06, 172 R, 201; 296/220.01; 312/297
See application file for complete search history.

(56) References Cited

U.S. PATENT DOCUMENTS

| 2,167,840 | A | * | 8/1939 | Hepworth ................. 160/172 R |
| 2,729,287 | A | * | 1/1956 | Goldner .......................... 160/33 |
| 3,000,437 | A | * | 9/1961 | Bennett .......................... 160/33 |
| 3,651,852 | A | * | 3/1972 | Neri .......................... 160/172 R |
| 4,379,478 | A |   | 4/1983 | Lichy |
| 4,867,220 | A | * | 9/1989 | Matsumoto et al. ............ 160/35 |
| 5,603,372 | A | * | 2/1997 | Farmont et al. .......... 160/370.21 |

(Continued)

FOREIGN PATENT DOCUMENTS

| DE | 19711333 A1 | 9/1998 |
| DE | 19824248 A1 | 12/1999 |

(Continued)

OTHER PUBLICATIONS

German Patent Office, German Search Report for Application No. 102010015537.3, dated Sep. 3, 2010.

*Primary Examiner* — David Purol
(74) *Attorney, Agent, or Firm* — Ingrassia Fisher & Lorenz, P.C.

(57) ABSTRACT

A rail system is provided having two profile rails, between which a lamellar configuration having multiple lamellar elements is provided. The lamellar element is implemented for a roller blind device, which can be guided in a rail system like a folding blind, having a lamellar body and having at least two guide elements, which are situated on diametrically opposing sides of the lamellar body and extend in the transverse direction of the lamellar element, for holding and/or guiding in at least one guide groove of the rail system, at least one first guide element having at least one extension differing in the transverse direction in relation to at least one second guide element.

8 Claims, 4 Drawing Sheets

(56) References Cited

U.S. PATENT DOCUMENTS

| | | | |
|---|---|---|---|
| 5,823,605 A * | 10/1998 | Seargeant | 296/100.09 |
| 6,321,819 B1 * | 11/2001 | Copp et al. | 160/35 |
| 6,478,204 B2 * | 11/2002 | Lange et al. | 224/539 |
| 2002/0005424 A1 | 1/2002 | Lange et al. | |
| 2005/0140164 A1 | 6/2005 | Wilms et al. | |
| 2006/0186710 A1 | 8/2006 | Hermsen | |
| 2009/0102245 A1 * | 4/2009 | Dorin et al. | 296/220.01 |

FOREIGN PATENT DOCUMENTS

| | | |
|---|---|---|
| DE | 10023778 A1 | 11/2001 |
| DE | 10201513 A1 | 1/2003 |
| DE | 102004051445 A1 | 4/2006 |
| DE | 102008029027 A1 | 1/2009 |

* cited by examiner

RETRACTABLE SAFETY COVER FOR A RAIL SYSTEM IN A MOTOR VEHICLE

CROSS-REFERENCE TO RELATED APPLICATION

This application claims priority to German Patent Application No. 10 2010 015 537.3, filed Apr. 20, 2010 and to German Patent Application No. 20 2009 017 836.6, filed Nov. 11, 2009, which are incorporated herein by reference in their entirety.

TECHNICAL FIELD

The technical field relates to a lamellar element for a roller blind device that can be guided in a rail system like a folding blind. Furthermore, the technical field relates to a lamellar configuration for a rail system. In addition, the technical field relates to a profile rail for a rail system. Moreover, the technical field relates to a rail system, in particular a rail system for a motor vehicle.

BACKGROUND

Various covers and screens like a folding blind for covering compartments are known from the prior art. A cover for a storage compartment in an interior equipment part of a vehicle, in particular in a center console of a passenger automobile, is known from DE 100 23 778 A1, the cover having a first cover element, which is guided in a first guide and covers a first storage compartment area, preferably a first beverage container receptacle. The cover is refined by a second cover element, which is guided in a second guide and covers a second storage compartment area, preferably a second beverage container receptacle. In addition, concrete embodiments are specified, in which the first cover element may be pushed below the second cover element and both cover elements are deflected laterally into a horizontal position upon opening of the second beverage container receptacle.

A displaceable cover for closing or exposing a storage space located underneath is known from DE 10 2004 051 445 A1. In order to provide a cover which is easy and simple to operate, only requires a small space, and additionally only has a low weight, it is provided according to DE 10 2004 051 445 A1 that the cover comprises a rigid plate and a roller blind adjoining thereon.

A roller blind, in particular for covering a storage space in an automobile, is known from DE 10 2008 029 027 A1, having a first and a second lamellar group, at least one lamella of the first lamellar group being pivotable around a rotational axis between an open position and a closed position.

In view of the foregoing, it is at least one object to provide a motor vehicle having a storage compartment which can be securely covered, and which is integrated in a visually appearing manner into the motor vehicle. In particular, it is an object to provide a flexible cover device for a storage space having a rail system, which ensures elegant protection for objects placed therein, is implemented in a space-saving manner, and has high operating comfort for a user. In addition, other objects, desirable features and characteristics will become apparent from the subsequent summary and detailed description, and the appended claims, taken in conjunction with the accompanying drawings and this background.

SUMMARY

A lamellar element is provided for a roller blind device, which can be guided in a rail system like a folding blind, having a lamellar body and having at least two guide elements, which are situated on opposing sides of the lamellar body and extend in the transverse direction of the lamellar element, for holding and/or guiding in at least one guide groove of the rail system, it is provided that at least one first guide element has at least one different extension in the transverse direction than at least one second guide element. A cover device is provided for a lamellar configuration having multiple connected lamellar elements that are connected to one another so that they can be collapsed and/or folded with one another in the longitudinal direction of the cover device, and is referred to as a folding blind. The lamellar element, more precisely the lamellar body, is implemented as rigid per se. Multiple lamellar elements can be articulated with one another. The lamellar body has a greater extension in a transverse direction of the cover device than in a longitudinal direction of the cover device. The depth of the lamellae is variable depending on the desired strength of the lamellae. The lamellar body has guide elements laterally, i.e., on the edges, which protrude from the lamella in the transverse direction using an extension to be received in a corresponding guide groove. The guide elements are implemented differently with respect to their extension or length. In one design, the guide elements are implemented as adjustable, for example, extensible and retractable, preferably via a corresponding mechanism. A total extension of the lamellar element including the guide elements and the lamellar body is greater than the spacing of the rails to one another. In this way, the guide elements protrude into the corresponding guide grooves in the rails, so that the lamellar elements are guided between the rails.

The lamellar elements are situated in the rail system as a lamellar configuration between two profile rails. The rail system correspondingly preferably has two parallel profile rails or rail units which are spaced apart from one another. The constant spacing of the profile rails preferably approximately corresponds to the width of the lamellae, i.e., their extension in the transverse direction without the guide elements. The profile rails have multiple guide grooves or one guide groove having multiple differently implemented areas in one design. The lamellar body preferably has four guide elements, which are correspondingly situated in pairs on diametrically opposing sides. In a further preferred embodiment, the guide elements which are situated on a shared side are implemented having different lengths.

In one embodiment of the present invention, it is provided that the lamellar body is implemented as plate-shaped having two narrow sides, two long sides, one upper side, and one lower side. In one embodiment, the upper side is adapted to an environment, for example, to a design of a motor vehicle interior. A coating or the like is provided for this purpose, for example. In one embodiment, a handle, such as a handle groove, a grip, or the like is situated on the upper side. In other embodiments, connectors are provided on the upper side, such as clip connection means, in order to attach further components to the upper side. The lower side faces toward a storage compartment. It can be implemented differently from the upper side. In a preferred embodiment, it is provided that the lower side has rounded, chamfered, or similar areas, in order to implement improved guiding in the event of contact on another lamellar element.

A further embodiment provides that two pin-like guide elements are implemented on each narrow side of the lamellar body. In an installed position between two guide rails, the lamellar body having its narrow sides is associated with the guide rails. The guide rails have at least one guide groove, which is implemented corresponding to the guide elements.

In order to implement the largest possible area cover between the guide rails, pin-like guide elements are provided, which protrude from the lamellar body and are received nearly completely in the respective guide groove. The pin-like guide elements are preferably implemented as cylinder pins or the like. The guide elements are permanently connected to the lamellar body. In other embodiments, the guide elements are implemented as removable from the lamellar body. An extension of the guide elements, with which the guide elements protrude from the narrow side, is adjustable via a corresponding fixing unit.

Still a further embodiment provides that the guide elements which are implemented on a shared narrow side have a differing extension in the transverse direction. Preferably, two guide elements are situated on each narrow side. The guide elements which are implemented as coaxial on diametrically opposing narrow sides are preferably implemented identically. The guide elements which are situated parallel to one another on a shared narrow side are preferably implemented differently. The guide elements preferably differ with respect to their extension in the transverse direction. Other differences such as shape and material can be implemented.

Furthermore, a lamellar configuration is provided for a rail system to implement a roller blind device implemented like a folding blind, it is provided that at least two lamellar elements according are connected to one another. In this way, the lamellar elements form a roller blind or also a cover device for a rail system. The lamellar configuration s implemented like a folding blind and preferably has multiple lamellar elements which are coupled to one another.

In one embodiment, it is provided that the lamellar elements are each situated having shorter guide elements, which extend in the transverse direction, in front in a run direction and having longer guide elements, which extend in the transverse direction, situated at the rear adjacent to one another, preferably flush in the transverse direction. At least one lamellar element preferably has a receptacle section on its upper side. A receptacle section is implemented on an upper side of at least one of the lamellar elements for placement of smaller objects, such as coins or keys, which are easily lost in a larger storage compartment. The receptacle section is implemented as a depression so that a shell-shaped receptacle compartment is formed. For example, multiple lamellar elements are implemented having such receptacle sections. In advantageous designs, lamellar elements having receptacle sections are implemented as wider and/or deeper than lamellar elements without receptacle sections. In another embodiment, the receptacle section is designed in such a way that it is used as a grip for a displacement of the lamellar configuration. In other designs, additional operating devices are provided.

In another embodiment, it is provided that the lamellar elements are connected to one another via at least one flexible strip element, which is situated on a lower side of the lamellar elements, in particular via a belt. Via the belt, which can also be a textile strip, for example, the lamellar elements are flexibly connected to one another. A flexible guide can thus be implemented in the case of a guide along a profile rail. Upon removal from a guide, all lamellar elements are connected via the belt. The belt is preferably removably connected to the lamellar elements, for example, via passage openings through which the belt can be guided, or via hook-and-loop, clip, or snap fastener closures, so that a lamellar element can preferably be removed from the belt without tools.

A further embodiment in turn provides that the lamellar elements are at least partially implemented from a light-opaque material. An undesired view below the lamellar configuration is prevented by the light-opaque implementation. Valuable objects may thus be left below the lamellar configuration in the motor vehicle so they are invisible to third parties. In addition, the material for the lamellae is preferably implemented as burglar-resistant or burglar-proof, so that a type of safe or lockbox may be implemented in the motor vehicle using the cover device.

In addition, embodiments of the invention include a profile rail for a rail system having two parallel profile rails spaced apart from one another in a transverse direction, which have a guide groove corresponding to guide elements of the lamellar elements for guiding lamellar elements which are guided between the profile rails, the guide groove having a guide cross-section suitable for guiding guide elements of the lamellar elements, it is provided that the guide groove has sections implemented having differing depths in the transverse direction for receiving guide elements extending different distances in the transverse direction. In this way, a guide groove for a shorter guide element and a longer guide element is implemented. In a first embodiment, the guide grooves partially overlap, so that they coincide and guide pins of different lengths are guided via the coincident guide grooves. In another area, the area of a guide groove, in particular the guide groove for a shorter guide element, is only partially implemented having the guide groove for a longer guide element. The guide grooves are implemented having different depths in a transverse direction, one depth for a longer guide element, another depth for a shorter guide element. The guide grooves are laterally delimited by a width. The width determines a movement tolerance of the guide elements transversely to the depth, i.e., in the transverse direction. The width of the guide groove for the longer guide element is equal to or less than the width for the shorter guide element in one area. The width for the guide groove assigned to the shorter guide element changes over the course of the profile rail, so that a lamellar element can perform a rotational movement around a rotational axis which is determined by two opposing guide elements, in addition to a longitudinal movement along the groove.

In one embodiment, it is provided that the cross-section of the guide groove is implemented as altered in the run direction of the guide groove. The run direction corresponds to a longitudinal direction of the guide groove and can run in a curve, for example. Received lamellar elements are movable along the run direction. The cross-section in the transverse direction has different depths for the guide grooves. One depth is assigned to a longer guide element. Another depth is assigned to a shorter guide element. The cross-section with respect to the depth for the longer guide element remains essentially unchanged over the run direction. The cross-section in regard to the depth for the shorter guide element changes at least partially in the run direction. In this way, it is possible that a received lamellar element also performs a rotational movement in addition to a translational movement. The variation of the cross-section is preferably selected so that the lamellar element maintains a preferred horizontal orientation, even in the event of a nonlinear, i.e., curved course of the guide groove or the profile rail.

In still another embodiment, it is provided that a first section of the guide groove having a first width is implemented as constant over the run direction and a second section of the guide groove having a second width is implemented as variable over the run direction. The first section having the first width thus forms a first guide groove for a longer guide element. The second section having a variable width forms a guide groove for a shorter guide element.

Still a further embodiment provides that the guide groove, including the second section, is implemented as tapering or expanding in a width direction of the profile rail. The change with respect to the width preferably occurs continuously. The change is implemented so that a lamellar element can be guided in the profile rail having a uniform orientation.

Not least, a rail system, in particular a rail system, is provided for a motor vehicle, two parallel profile rails according to the invention, which are spaced apart from one another in a transverse direction, and between which at least one lamellar configuration is guided.

In a preferred embodiment, it is further provided that the profile rails run in a curve, i.e., having varying spacing to a rail base, in particular with respect to a vertical spacing to a rail base. The profile rail is shaped arbitrarily and is adaptable to various curve courses. For example, the profile rail runs in a C, U, or L or J shape.

In still a further embodiment, it is provided that the second section of the cross-section of the guide groove is implemented as widening so that the lamellar elements, upon movement from an essentially horizontal area into the curved area of the profile rails, are situated stacked on one another, an essentially horizontal orientation of the lamellar elements being ensured.

In addition, a further embodiment provides that the profile rails are implemented as a frame having a lamellar configuration inserted in the profile rails as a shared module, which can be connected to a carrier system without tools, in particular can be clipped therein.

In the rail system for a motor vehicle, in particular for a center console space of a motor vehicle, comprising two interacting rail units which are spaced apart from one another, and which each have at least one guide groove on their sides facing toward one another, and at least one lamellar configuration, which is guided using guide elements in the guide grooves between the rails, it is preferably provided that the lamellar configuration has multiple lamellar elements, which adjoin one another on their longitudinal sides and are connected to one another via a belt. The rail system has two rail units or profile rails, which extend in a floor area approximately in a center arm console area in the vehicle longitudinal direction. The rails preferably run in an arc having an increasing spacing from the floor area in the direction of the cockpit area. In this way, the rails span a storage space between and below the rails, which may be covered on top using the lamellar configuration. The guide grooves also run corresponding to a rail shape in such a way that the lamellar configuration, which is guided in the guide grooves and is designed like a folding blind, is movable along the arc-shaped area. The lamellar elements of the cover device are implemented as collapsible and can thus be placed in a narrow space to open an access opening to the storage space. By moving apart the lamellar configuration, which is collapsed like a fan, the storage space can be covered on top, i.e., toward a passenger compartment. The storage space is preferably laterally covered by walls, so that the opening in which the lamellar configuration is situated forms the only access opening. The walls of the storage space are formed by existing structures of the motor vehicle, such as motor vehicle seats, in advantageous designs.

In a further embodiment, it is provided that each profile rail has multiple guide grooves or one guide groove having different areas for guiding the lamellar configuration. The profile rails have multiple guide groove areas in order to have the guide elements of various lengths for receiving the lamellar configuration. In this way, a multifunctional rail system is implemented. The guide elements are guided in the guide groove so that they remain essentially horizontally oriented during the movement.

A further embodiment in turn provides that the guide grooves run spaced apart from a floor area, in order to implement a storage space between floor area and profile rails which can be at least partially covered by the lamellar configuration.

Embodiments of the invention are preferably situated in a motor vehicle, in particular in a motor vehicle having an interior, at least one rail system being situated in the interior. The rail system is preferably implemented close to the floor in a central arm console area. The rail system can be suitably situated in various ways. For example, the rail system is situated close to the ceiling and/or transversely to a vehicle longitudinal direction. In other embodiments, two rail systems are situated adjacent to one another. The rail systems extend in a cargo space in still other exemplary embodiments.

Features or components of various embodiments may be combined in order to thus obtain further embodiments. All features and/or advantages arising from the claims, the descriptions, or the drawings, including design details, spatial configurations, and method steps, may be essential to the invention both alone and also in greatly varying combinations.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the application and uses. Furthermore, there is no intention to be bound by any theory presented in the preceding background or summary or the following detailed description.

FIG. 1 to FIG. 10 show an exemplary embodiment of a rail system 30 according to an embodiment in details or as a whole. The rail system 30 is implemented as a rail system 30 for a motor vehicle, in particular for an area of a center arm console (not shown here). For this purpose, the rail system 30 comprises two parallel profile rails 20, which are spaced apart from one another in the transverse direction Q of the motor vehicle, between which at least one lamellar configuration 40 having at least two lamellar elements 1 is guided. The profile rails 20 run in a curve in this case, i.e., having a varying vertical spacing to a rail base B. According to the figures, the profile rails 20, which are preferably implemented as mirror-symmetric, have a curved section and a linear section, which runs approximately parallel to the rail base S. The lamellar configuration 40 is received so it can be guided between the profile rails 20. The lamellar configuration 40 has multiple lamellar elements 1. The lamellar elements 1 are shown more clearly in FIG. 1 to FIG. 3.

Figure 1:
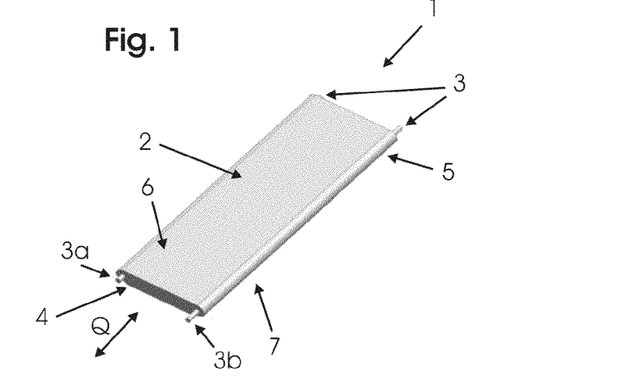
FIG. 1 schematically shows a lamellar element in a perspective view.
Figure 2:
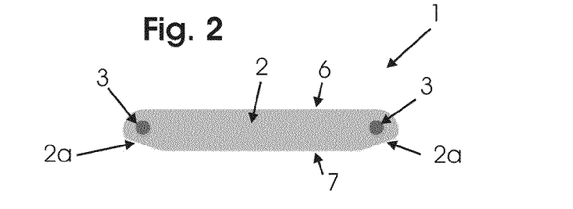
FIG. 2 schematically shows the lamellar element from FIG. 1 in a front view.
Figure 3:
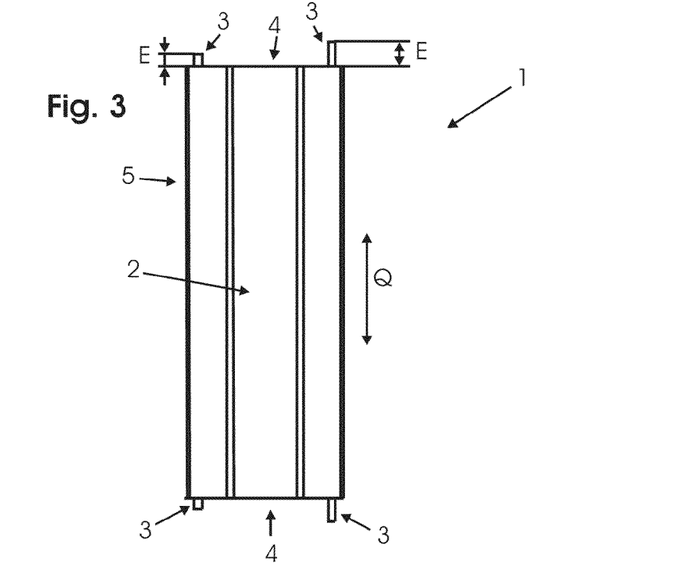
FIG. 3 schematically shows the lamellar element from FIG. 1 in a bottom view.

FIG. 1 schematically shows the lamellar element 1 in a perspective view. FIG. 2 schematically shows the lamellar element 1 in a front view. FIG. 3 schematically shows the lamellar element 1 in a bottom view. The lamellar element 1 is implemented for a roller blind device, which can be guided in a rail system 30 like a folding blind. The lamellar body 2 is implemented as plate-shaped having two narrow sides 4, two long sides 5, an upper side 6, and a lower side 7. The long sides 5 essentially extend in a transverse direction Q. The narrow sides 4 are spaced apart parallel to one another in the transverse direction Q. The lamellar body 2 has two guide elements 3 on each of the narrow sides 4. The guide elements 3 are implemented as pin-like guide elements 3 in the form of a cylindrical pin. Two guide elements 3 are situated on each narrow side 4. The guide elements 3 protrude in the transverse direction Q from the respective narrow side 4 with an extension E. The guide elements 3 are situated on diametrically opposing ends of the narrow sides 4. The guide elements 3 are implemented essentially identically, but differ at least with respect to their extension E in the transverse direction Q. One guide element 3, for example, a front guide element 3a, is implemented having a shorter extension E. The other guide element 3, for example, a rear guide element 3b, is implemented having a longer extension E. As may be clearly seen in FIG. 2, the lower side 7 of the lamellar body 2 is implemented having a chamfered or rounded area 2a. This is used for better contact and/or guiding of the lamellar body 2 when it rests on another lamellar body 2 or is guided past it along a guide, for example. The different extensions of the various guide elements 3 are clearly shown in FIG. 3. The guide elements 3 of a narrow side 4 are situated essentially coaxially to the corresponding guide elements 3 of the other narrow side 4. As already noted, the lamellar elements 1 are implemented to be guided in at least one profile rail 20.

Figure 4:
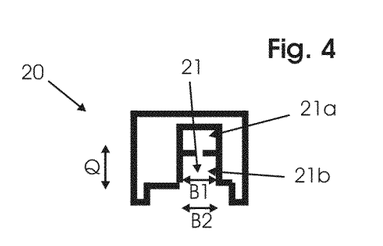
FIG. 4 schematically shows a profile rail in a first cross-sectional view.
Figure 5:
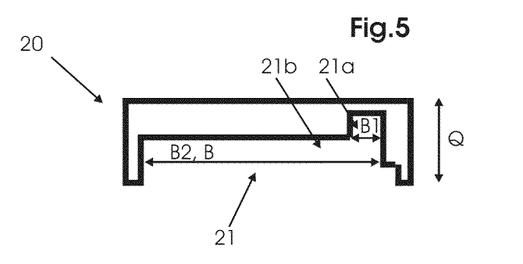
FIG. 5 schematically shows the profile rail from FIG. 4 in a second cross-sectional view.

FIG. 4 and FIG. 5 show an exemplary embodiment of a profile rail 20 in cross-section. FIG. 4 schematically shows the profile rail 20 in a first cross-sectional view, and FIG. 5 schematically shows the profile rail 20 in a second cross-sectional view. The illustrated cross-section of the profile rail 20 is implemented as essentially rectangular. The profile rail 20 is suitable for the rail system 30, having two profile rails 20 spaced apart from one another in the transverse direction Q. The profile rail 20 has a guide groove 21 corresponding to guide elements 3 of the lamellar elements 1 for guiding lamellar elements 1 guided between the profile rails 20. The guide groove 21 has a guide cross-section suitable for guiding guide elements 3 of the lamellar elements 1. The guide cross-section is implemented so that the guide groove 21 has sections 21a, 21b implemented having different depths in the transverse direction Q for receiving guide elements 3 extending different directions in the transverse direction Q. The section 21a is implemented to receive the longer, rear guide element 3b. For this purpose, the section 21a has a deeper extension in the transverse direction Q, which corresponds to the extension E of the guide element 3b. The width B1 of the section 21a corresponds to a width of the guide element 3b, so that the guide element 3b is movable with some tolerance in the section 21b.

The section 21b is implemented to receive the shorter, front guide element 3a. For this purpose, the section 21b has a less deep extension in the transverse direction Q, which corresponds to the extension E of the guide element 3a. The width B2 of the section 21b corresponds to a width of the guide element 3a, so that the guide element 3a is movable with some tolerance in the section 21b shown in FIG. 3. As may be seen on the basis of FIG. 5, the section 21b is implemented as variable with respect to its width B2, i.e., the section 21b shown in FIG. 4 is significantly narrower and therefore has a lesser width B2 than the section 21b shown in FIG. 5. The corresponding guide element 3a moves accordingly along a wall of the section 21b.

Figure 6:
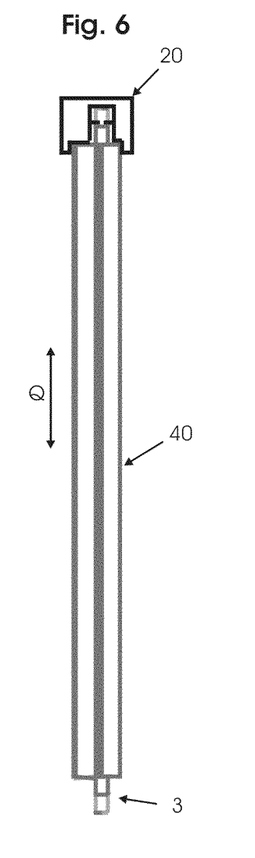
FIG. 6 schematically shows a profile rail from FIG. 4 having inserted lamellar element from FIG. 1 in a first cross-sectional view.

FIG. 6 schematically shows the profile rail 20 having inserted lamellar element 1 in a first cross-sectional view. The lamellar element 1 is situated having its guide elements in the guide groove 21 of the profile rail. In the illustrated view, both guide elements 3 are guided closely in the sections 21a and 21b, so that no pivot of the lamellar element 1 around an axis formed by the longer, rear guide elements can occur here. Although only one lamellar element 1 is visible in FIG. 6, preferably multiple lamellar elements 1, which are connected to form a lamellar configuration 40, are situated so they can be guided in the guide groove 21.

Figure 7:
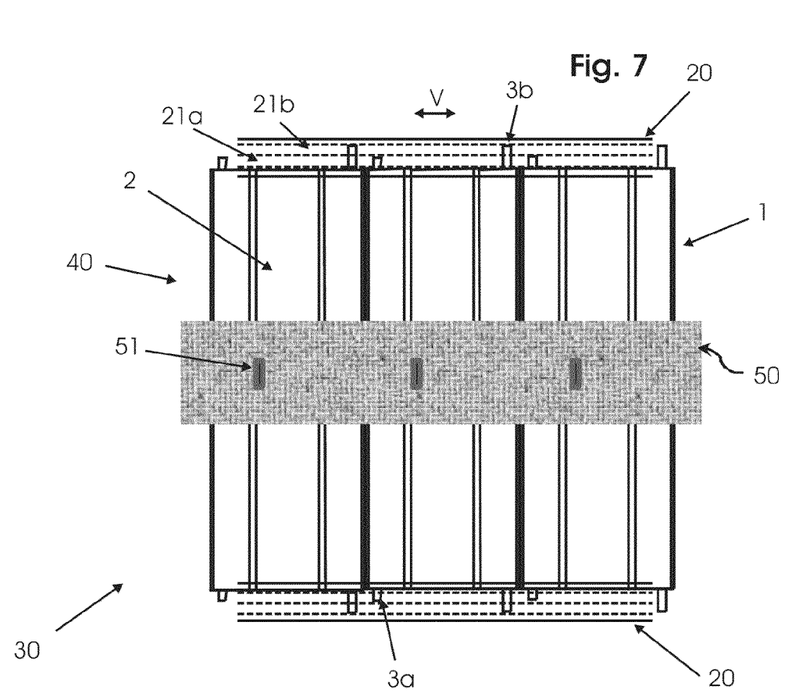
FIG. 7 schematically shows a detail of a rail system in a top view.

FIG. 7 schematically shows a top view of a detail of the rail system 30 having lamellar configuration 40 guided between two profile rails 30. The lamellar configuration 40 is suitable for the rail system 30. For this purpose, the lamellar configuration 40 is implemented as a roller blind device like a folding blind. The lamellar configuration 40 has at least two lamellar elements 1. The lamellar elements 1 are connected adjacent to one another and adjoining one another on their long sides 5. The lamellar elements 1 are oriented flush to one another in the transverse direction Q. It is clearly shown in FIG. 7 how the guide elements 3a, 3b of different lengths are guided in different sections 21a, 21b of the guide grooves 21. An essentially horizontal section of the guide rails 20, in which the lamellar elements 1 are situated horizontally adjacent to one another, is shown in FIG. 7. In the illustrated area, the cross-section of the guide groove corresponds to the cross-section shown in FIG. 4. The lamellar elements 1 or the lamellar configuration 40 is movable in a run direction V, in which the profile rail 20 and thus also the guide groove 21 extend. The individual lamellar elements 1 remain essentially horizontally oriented along the run direction V independently of the curvature of the profile rail 20. In order that the lamellar elements 1 are situated folded one over another or laid one over another in an open position or an open state of the rail system 30, the lamellar elements 1 are connected to one another via a flexible strip element 50, in particular via a belt. The flexible strip allows a continuous connection of the lamellar elements 1 to one another, without substantially restricting a relative rotation of the individual lamellar elements 1 to one another. The belt is connected to the individual lamellar elements 1 via suitable connectors 51, for example, via clip closures.

Figure 8:
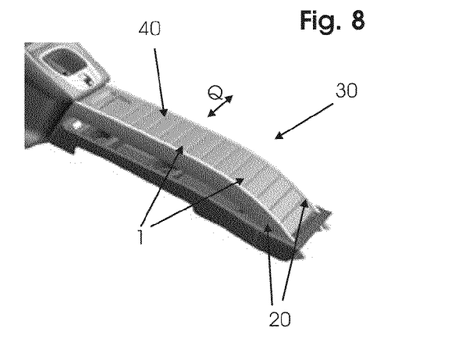
FIG. 8 schematically shows a rail system from FIG. 7 in a closed state in a perspective view.
Figure 9:
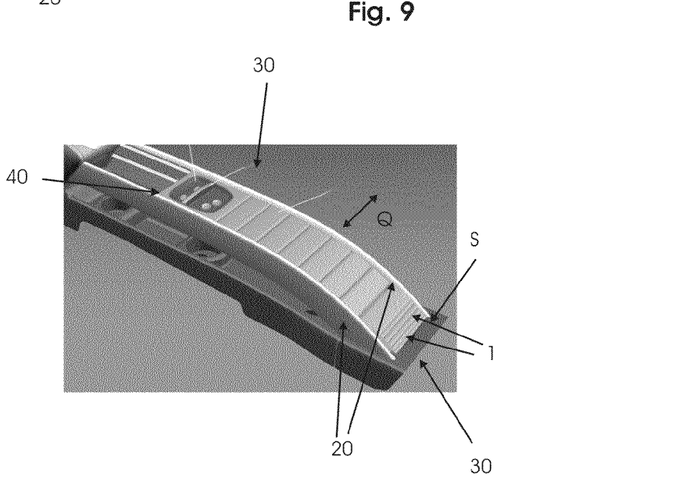
FIG. 9 schematically shows the rail system from FIG. 7 in a partially open state in a perspective view.

The complete rail system is shown situated in the area of a center console of a motor vehicle in FIG. 8 and FIG. 9. FIG. 8 schematically shows a perspective view of the rail system 20 in a closed state. FIG. 9 schematically shows a perspective view of the rail system 20 in a partially open state. In the closed state, the lamellar configuration 40 covers a storage space, which is spanned thereby between the two profile rails 20. The lamellar elements 1 of the lamellar configuration 40 all adjoin one another on their long sides 5 and thus form a closed cover. If the lamellar elements 1 are moved to bring the rail system 30 into an open state, the lamellar elements 1 stack up on one another in an end area of the profile rails 20. In this area, the profile rails 20 are laid one over another like a fan and are thus situated in a space-saving way. In order to cause this, the width of the section 21b of the guide groove 21, which is implemented to receive the front guide elements 3a, is implemented in a curved area of the profile rails 20 in relation to a linear area of the profile rails 20. The change of the cross-section, which was already schematically shown in FIG. 4 and FIG. 5, is shown via the run direction V in FIG. 10.

Figure 10:
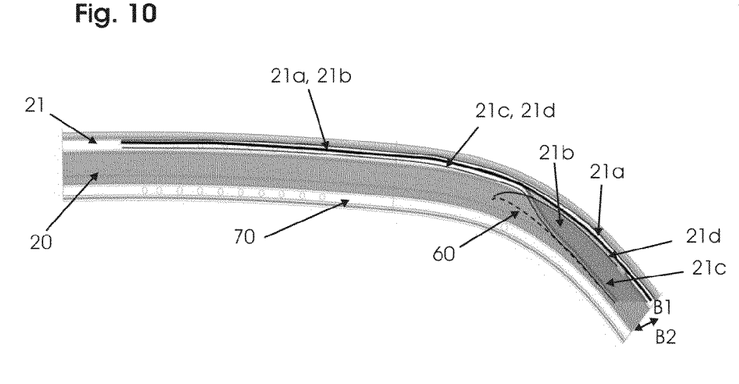
FIG. 10 schematically shows a detail of a profile rail from FIG. 4 in a side view.

FIG. 10 schematically shows a side view of a detail of the profile rail 20 from FIG. 4. In the essentially linear, horizontal area of the profile rail, the width B1 of the section 21a approximately corresponds to the width B2 of the section 21b. In the curved area of the profile rail 20, the width B2 of the section 21b changes. The width B2 widens so that the front guide element 3a moves along the wall 21c. The rear guide element 3b moves further along the wall 21d of the section 21a. Through the course of the wall 21d, as the guide element 3a slides along the wall 21c, a rotation occurs around the axis formed by the rear guide elements 3b, whereby an essentially horizontal orientation of the lamellar body is implemented. Another orientation may be caused by another course of the wall 21c in relation to the wall 21d. The orientation of the lamellar elements 1 is supported by a guide element 60, which is implemented as a spring element. The spring element presses the lamellar elements 1 into a corresponding orientation position, so that the lamellar elements 1 are situated one on top of another in a space-saving way in the open state of the rail system 30. A further guide groove 70 is implemented in the profile rail 20 in one embodiment.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A lamellar configuration for a rail system and adapted for implementation of a roller blind device, comprising:
   a first lamellar element; and
   a second lamellar element connected and adjacent to the first lamellar element, the second lamellar element comprising:
      a lamellar body;
      a first guide element and a second guide element situated on diametrically opposing sides of the lamellar body and extend in a transverse direction;
      at least one guide groove adapted to interact with at least one of the first guide element or the second guide element;
      an extension of the first guide element that differs in the transverse direction in relation to the second guide element, and
   wherein the first lamellar element and the second lamellar element are each situated having shorter guide elements extending in the transverse direction in front in a run direction and having longer guide elements extending in the transverse direction at the rear in the run direction.

2. The lamellar configuration according to claim 1, wherein the lamellar body is substantially planar.

3. The lamellar configuration according to claim 2, wherein the first and second guide elements are pin-like guide elements disposed on each narrow side of the lamellar body.

4. The lamellar configuration according to claim 1, wherein the first lamellar element and the second lamellar element are connected with a flexible strip element situated on a lower side of the first lamellar element and the second lamellar element.

5. A rail system for a motor vehicle, comprising:
   a first parallel profile rail;
   a second parallel profile rail spaced apart from the first parallel profile rail in a transverse direction, the first parallel profile rail and the second parallel profile rail comprising a guide groove corresponding to guide elements of lamellar elements and adapted to guide the lamellar elements between the first parallel profile rail and the second parallel profile rail that each comprise a guide cross-section suitable for the guide elements of the lamellar elements;
   sections of the guide groove implemented having different depths in the transverse direction and adapted to receive the guide elements that are adapted to extend at different amounts in the transverse direction; and
   a first and a second lamellar element guided between the first parallel profile rail and the second parallel profile rail, each of the first and second lamellar elements comprising:
      a lamellar body;
      a first guide element and a second guide element situated on diametrically opposing sides of the lamellar body and extend in a transverse direction;
      at least one guide groove adapted to interact with at least one of the first guide element or the second guide element;
      an extension of the first guide element that differs in the transverse direction in relation to the second guide element, and
   wherein the first lamellar element and the second lamellar element are each situated having shorter guide elements extending in the transverse direction in front in a run direction and having longer guide elements extending in the transverse direction at the rear in the run direction.

6. The rail system according to claim 5, wherein the first parallel profile rail and the second parallel profile rail with respect to a vertical distance to a rail base run in a curve.

7. The rail system according to claim 5, wherein a second section of a cross-section of the guide groove widens so that the lamellar elements, in response to a movement from an essentially horizontal area into a curved area of the first parallel profile rail and the second parallel profile rail are situated stacked one on top of another, ensuring an essentially horizontal orientation of the lamellar elements.

8. The rail system according to claim 5, wherein the first parallel profile rail and the second parallel profile rail are implemented as a frame having a lamellar configuration inserted in the first parallel profile rail and the second parallel profile rail as a module that is adapted for connection to a carrier system.

* * * * *